(12) United States Patent
Komorida et al.

(10) Patent No.: US 7,562,515 B2
(45) Date of Patent: Jul. 21, 2009

(54) LOWER LIMIT ADJUSTMENT MECHANISM FOR RIDING TYPE MOWER

(75) Inventors: Takeshi Komorida, Sakai (JP); Hideya Umemoto, Sakai (JP); Yoshiyuki Esaki, Sakai (JP)

(73) Assignee: Kubota Corporation, Osaka (JP)

( * ) Notice: Subject to any disclaimer, the term of this patent is extended or adjusted under 35 U.S.C. 154(b) by 88 days.

(21) Appl. No.: 11/515,229

(22) Filed: Sep. 1, 2006

(65) Prior Publication Data
US 2007/0169456 A1 Jul. 26, 2007

(30) Foreign Application Priority Data

Jan. 26, 2006 (JP) ............... 2006-018099
Apr. 28, 2006 (JP) ............... 2006-126680

(51) Int. Cl.
*A01D 34/00* (2006.01)
(52) U.S. Cl. ........................ 56/17.1; 56/14.9
(58) Field of Classification Search ............. 56/14.7, 56/14.9–15.3, 17.1
See application file for complete search history.

(56) References Cited

U.S. PATENT DOCUMENTS

| | | | | |
|---|---|---|---|---|
| 1,627,711 A * | 5/1927 | Pearson | ...... | 56/16.2 |
| 3,461,656 A * | 8/1969 | Ausdall | ...... | 56/249 |
| 4,589,249 A * | 5/1986 | Walker et al. | ...... | 56/16.6 |
| 4,977,733 A * | 12/1990 | Samejima et al. | ...... | 327/408 |
| 6,122,903 A * | 9/2000 | Hayashi et al. | ...... | 56/15.8 |
| 6,758,031 B2 * | 7/2004 | Franet et al. | ...... | 56/14.9 |
| 6,837,032 B1 * | 1/2005 | Swartzendruber et al. | .... | 56/14.9 |
| 7,059,109 B2 * | 6/2006 | Samejima et al. | ...... | 56/17.1 |
| 2001/0037634 A1 * | 11/2001 | Schick | ...... | 56/15.9 |
| 2004/0216438 A1 * | 11/2004 | Poulson et al. | ...... | 56/17.1 |
| 2006/0090442 A1 * | 5/2006 | Komiya et al. | ...... | 56/14.7 |
| 2007/0012016 A1 * | 1/2007 | Strope | ...... | 56/17.1 |

FOREIGN PATENT DOCUMENTS

JP 2002-238325 8/2002

* cited by examiner

*Primary Examiner*—Thomas B Will
*Assistant Examiner*—Mai T Nguyen
(74) *Attorney, Agent, or Firm*—The Webb Law Firm, P.C.

(57) ABSTRACT

A riding type mower comprises: a plurality of wheels including at least one driven wheel; a vehicle body supported by the plurality of wheels; a driver's seat supported by the vehicle body; a mower unit located below the vehicle body; a suspension mechanism for vertically movably supporting the mower unit from the vehicle body, the suspension mechanism having a restraint member operatively connected to the suspension mechanism; an operation mechanism for operating the suspension mechanism; a stopper for setting a lower limit for a vertical position of the mower unit to define a cutting height by abutment against the restraint member, the stopper is adapted to be rotated to change the lower limit; a lower limit adjustment element located laterally of the driver's seat and rotatable to rotate the stopper; and a linking mechanism for operatively connecting the lower limit adjustment element with the stopper.

10 Claims, 14 Drawing Sheets

LOWER LIMIT ADJUSTMENT MECHANISM FOR RIDING TYPE MOWER

BACKGROUND OF THE INVENTION

1. Field of the Invention

The present invention relates to riding type mowers having a mower unit connected to the chassis thereof in such a manner as to be capable of freely moving upwards and downwards.

2. Description of Related Art

In conventional riding type mowers, a mower unit is moved downwards when an operation mechanism is operated, and when the moving device has moved downwards to a set height, a stopper acts, and downward motion of the mower unit stops. In this way, by simply operating the operation mechanism to a downward-movement side, conventional riding type mowers can accurately move a mower unit downward to a desired height set by a stopper.

This type of riding type mower is presented, for example, in JP 2002-238325A (paragraphs 0033 and 0034; FIG. 2, FIG. 4, and FIG. 6).

The mower disclosed therein is configured such that a hydraulic cylinder (equivalent to an operation mechanism) is linked to a mower constituting a mower unit through an action of an elevation link mechanism (equivalent to a linking mechanism), and when the elevation link mechanism is operated by the hydraulic cylinder, the mower is moved upwards and downwards with respect to a riding type vehicle (equivalent to a self-propelled chassis). Further, the configuration thereof is such that a stopper acts on a restraint pin provided in a drive arm of the elevation link mechanism, setting the limit of a swinging motion of the drive arm. As a result, a downward motion limit of the elevation link mechanism is set, and therefore, a downward motion limit of the mower is set. A lower limit adjustment mechanism is configured such that by rotating an adjustment knob disposed below a driving seat so as to adjust the stopper through rotation thereof, a height of a rotational stepwise stopper surface of the stopper is selected and the downward swinging motion limit of the drive arm is adjusted.

When employing the above-described conventional technology, since an adjustment knob constituting a lower limit adjustment element for adjusting the stopper through rotation thereof is linked to the stopper such that the adjustment knob is rotated about an axis of rotation identical to an axis of rotation of the stopper, if the stopper is, for example, disposed so as to act on the linking mechanism of the mower unit and the operation mechanism, the lower limit adjustment element must be disposed below the driving seat, and therefore, the lower limit adjustment element becomes difficult to operate and lower limit adjustment of the moving device becomes difficult to perform.

SUMMARY OF THE INVENTION

It is an object of the present invention to provide a riding type mower allowing lower limit adjustment of a mower unit to be easily accomplished regardless of a position of a stopper.

A riding type mower in accordance with the present invention comprises: a plurality of wheels including at least one driven wheel; a vehicle body supported by the plurality of wheels; a driver's seat supported by the vehicle body; a mower unit located below the vehicle body; a suspension mechanism for vertically movably supporting the mower unit from the vehicle body, the suspension mechanism having a restraint member operatively connected to the suspension mechanism; an operation mechanism for operating the suspension mechanism; a stopper for setting a lower limit for a vertical position of the mower unit to define a cutting height by abutment against the restraint member, the stopper is adapted to be rotated to change the lower limit; a lower limit adjustment element located laterally of the driver's seat and rotatable to rotate the stopper; and a linking mechanism for operatively connecting the lower limit adjustment element with the stopper.

DESCRIPTION OF THE PREFERRED EMBODIMENTS

The following is a description of embodiments of the present invention, with reference to the accompanying drawings.

Figure 1:
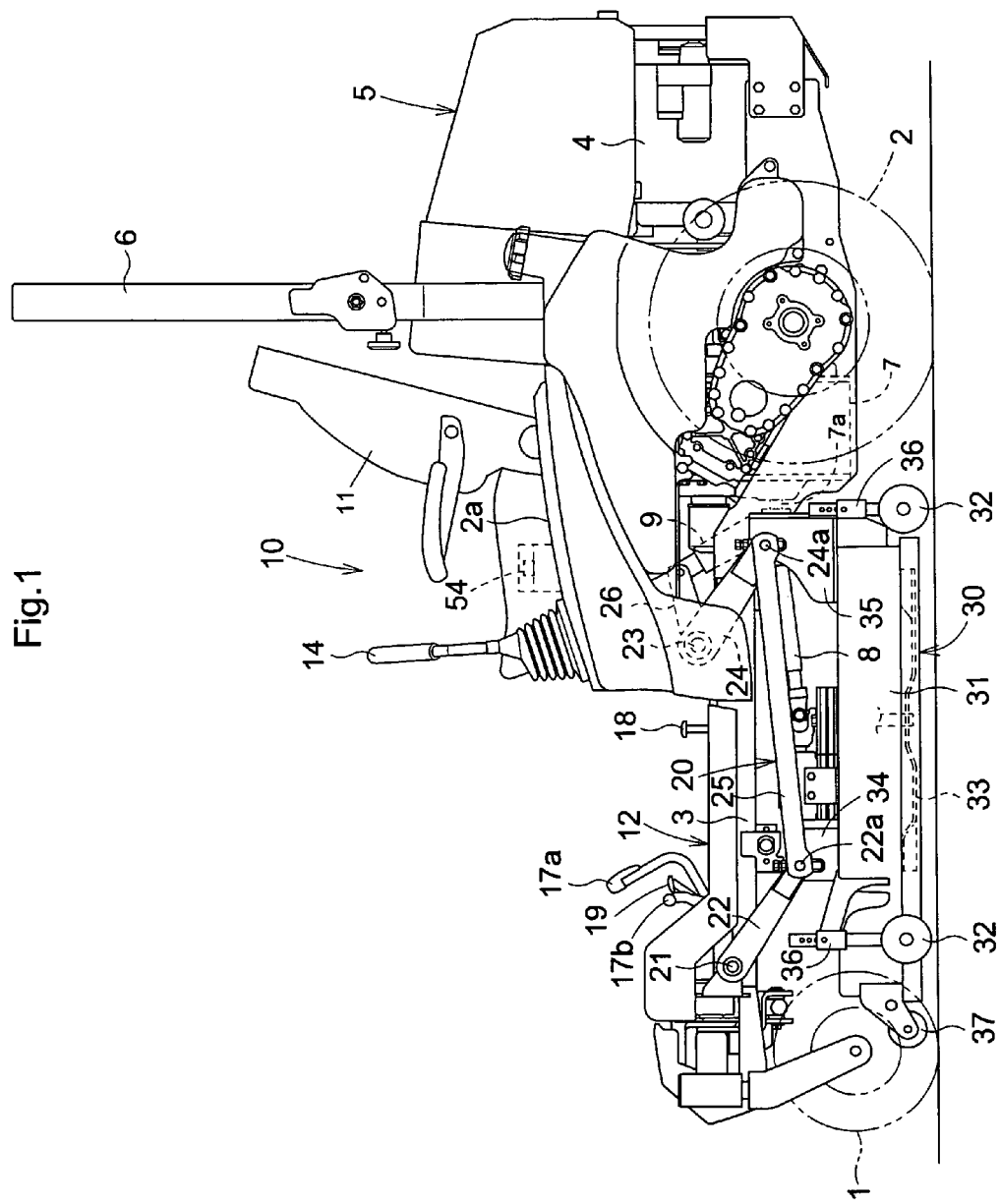
FIG. 1 is a side view of an entire riding type mower.
Figure 2:
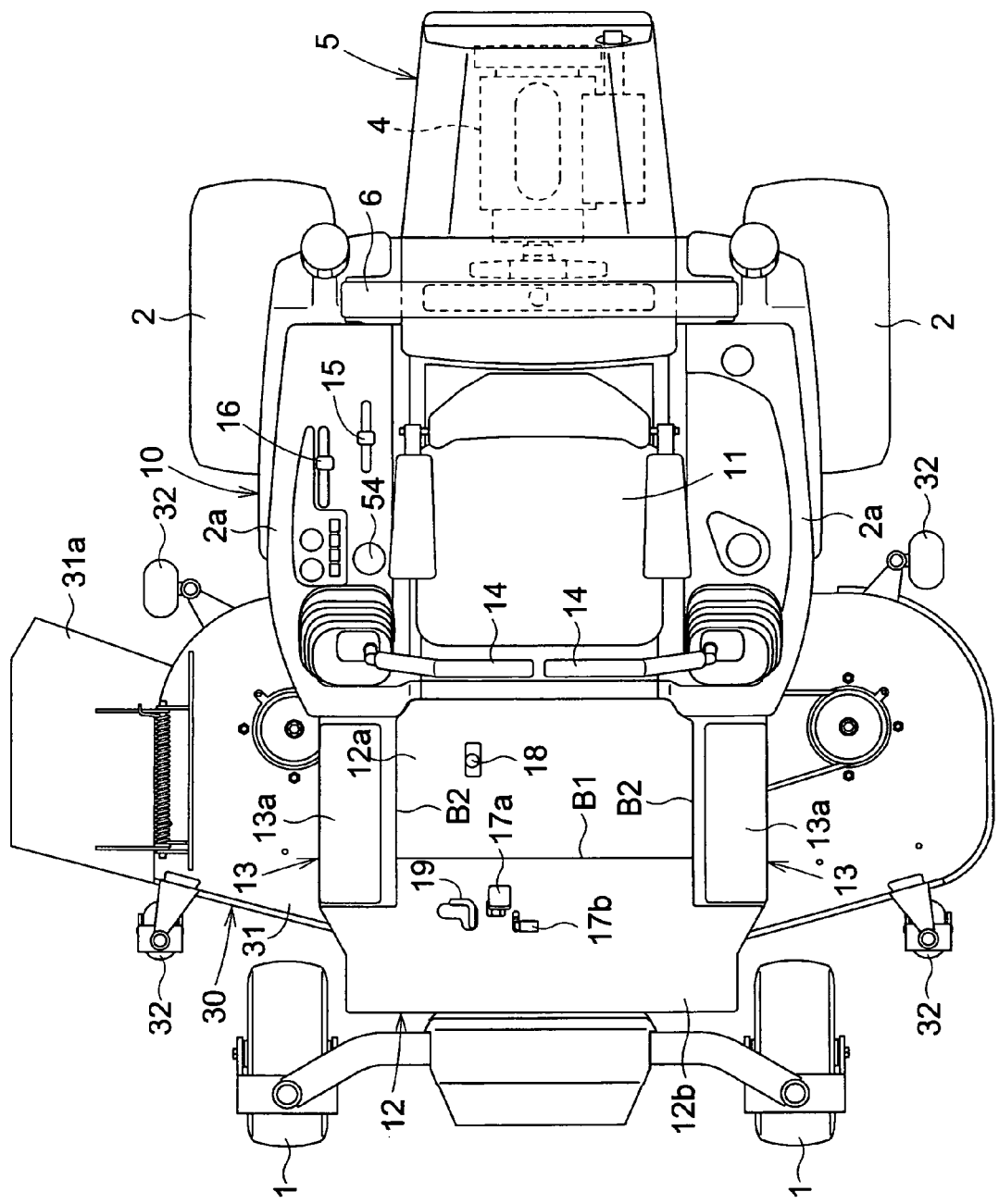
FIG. 2 is a plan view of an entire riding type mower.

As shown in FIG. 1 and FIG. 2, a riding type mower has a frame 3 of a self-propelled chassis providing a pair of caster type front wheels 1 disposed left and right in such a manner as to be capable of freely rotating, a pair of rear wheels 2 disposed left and right in such a manner as to be capable of being freely driven, a drive section 5 wherein an engine 4 provided at a rear-end section of the frame 3 is installed, a riding driving section 10 wherein a driving seat 11 disposed close to a front side of the drive section 5 is installed, and a topple protection frame 6 disposed close to a rear side of the driving seat; and is configured such that the frame 3 is connected with a mower unit 30 through an action of a link mechanism 20 disposed between the front and rear wheels of the frame 3, and an output of the engine 4 is transferred to the mower unit 30 from a power take-off shaft 7a disposed in a transmission case 7 supported by the left and right rear wheels 2 through an action of a rotating shaft 8.

This mower performs lawn mowing and grass cutting operations, and when a hydraulic elevation cylinder 9 disposed below the driving seat 11 is operated, the elevation cylinder 9 performs raising and lowering operations of the link mechanism 20 with respect to the frame 3, and as a result thereof, the mower unit 30 is lowered and raised respectively to a lowered operation condition wherein gauge wheels 32 disposed on front and rear sides of a cutting blade housing 31 make contact with a ground surface and a raised non-operation condition wherein the gauge wheels 32 are raised from the ground surface. When the mower unit 30 is set to the lowered operation condition and the self-propelled chassis is driven, the mower unit 30 performs cutting processing of a lawn or grass using cutting blades 33 driven so as to rotate about shafts oriented vertically within the cutting blade housing 31 in a plurality of locations therein, and the cut grass or lawn is conveyed to one side of the cutting blade housing 31 and discharged from a discharge opening 31a to the exterior of the cutting blade housing 31 by wind generated by the rotation of the cutting blades 33.

As shown in FIG. 2 etc., the riding driving section 10 of the self-propelled chassis is configured having the driving seat 11, disposed between right and left rear wheel fenders 2a, a driving section floor 12 supported by the frame 3 in front of and below the driving seat 11, and driver access openings 13 formed so as to provide driver steps 31a on both sides of the driving section floor 12 and at exactly or almost exactly the same height as the disposition height of the driving section floor 12.

Steering levers 14 are provided on both sides of the driving seat 11 of the riding driving section 10, an accelerator lever 15 and an operation clutch lever 16 are provided on one side of the driving seat 11, and a brake pedal 17a, a parking brake pedal 17b, a raising pedal 18, and a lowering pedal 19 are provided at a front end side of the driving section floor 12.

Figure 11:
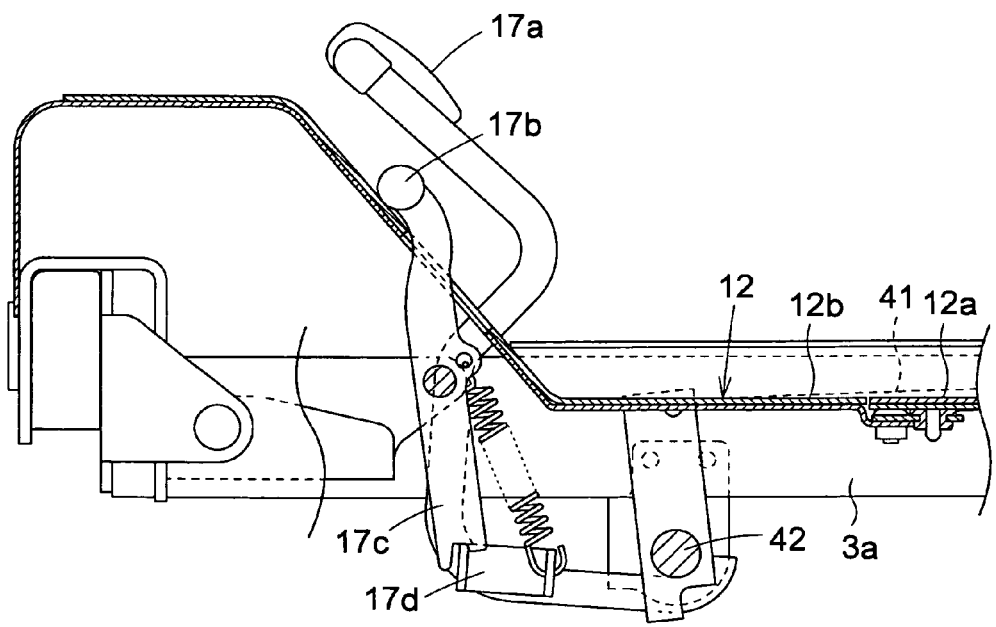
FIG. 11 is a side view showing an application condition of a parking brake pedal.

The accelerator lever 15 performs acceleration operations of the engine 4. In order to engage and disengage transmission of drive force from the engine 4 to the mower unit 30, the operation clutch lever 16 performs clutching and declutching operations of an operation clutch (not shown) provided in the transmission case 7, driving and stopping the mower unit 30. The brake pedal 17a operates a drive-use brake (not shown) provided in the transmission case 7, applying brakes to the left and right rear wheels 2. As shown in FIG. 11, the parking brake pedal 17b engages a hook 17c thereof with an engagement piece 17d provided in the brake pedal 17a, maintaining the brake pedal 17a in a pressed-down condition, and as a result, the parking brake pedal 17b maintains the drive-use brake in an applied condition and applies parking brakes to the left and right rear wheels 2.

In order to transfer drive force from the engine 4 to each of the left and right rear wheels 2, 2, the left and right steering levers 14 are each linked individually to speed variation sections of a pair of hydrostatic continuously variable transmission devices (not shown) provided in the transmission case 7. When the left side steering lever 14 is swung in a fore-and-aft direction of the chassis, the hydrostatic continuously variable transmission device of the left rear wheel 2 performs speed variation, and when the right side steering lever 14 is swung in a fore-and-aft direction of the chassis, the hydrostatic continuously variable transmission device of the right rear wheel 2 performs speed variation. In this way, when both the left and right rear wheels 2, 2 are driven with an identical drive speed in a forward or backward direction, and self-propelled chassis can move forwards or backwards in a straight line, and by inducing a difference in the drive speed or the drive direction of the left and right rear wheels 2, 2, the self-propelled vehicle can be driven in an arc towards the left or the right.

Figure 3:
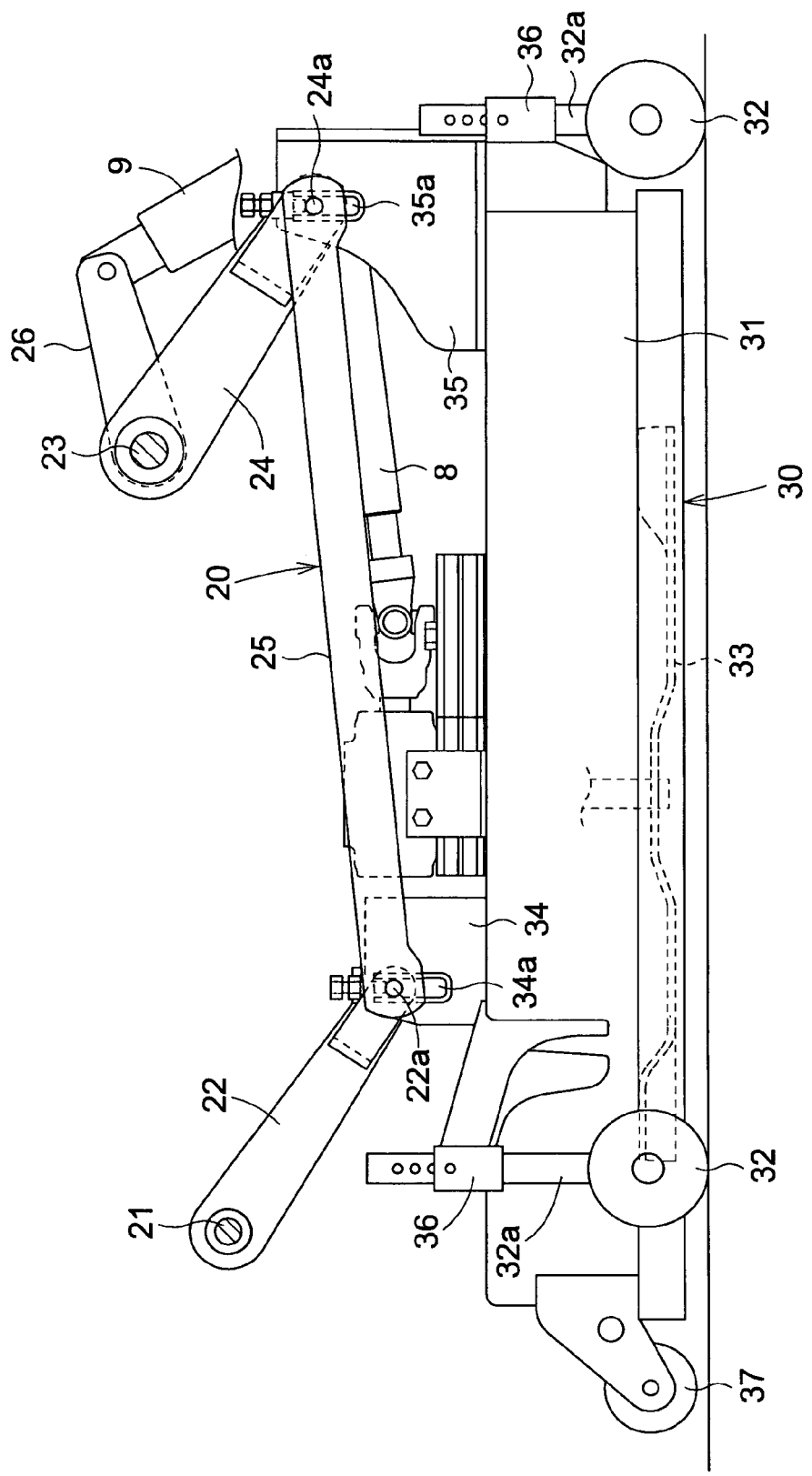
FIG. 3 is a side view of a mower unit and a link mechanism.

As shown in FIG. 1 and FIG. 3, the link mechanism 20 has a pair of left and right front swing links 22 supported at both outer sides of a front end section of the frame 3 by a rotating shaft 21 oriented in a transverse direction of the chassis in such a manner as to be capable of freely swinging, and rear swing links 24 supported at both outer sides of the frame 3 in the vicinity of the underside of the driving seat 11 by a rotating shaft 23 oriented in a transverse direction of the chassis in such a manner as to be capable of freely swinging. A lower end side of each of the left and right front swing links 22 is connected to a front linking bracket 34 of the cutting blade housing 31 in such a manner as to be capable of freely rotating, and a lower end side of each of the left and right rear swing links 24 is connected to a rear linking bracket 35 of the cutting blade housing 31 in such a manner as to be capable of freely rotating. In addition, a link 25 connected at a front end thereof to the left side front swing link 22 through an action of a linking pin 22a connecting the front swing link 22 to the front linking bracket 34 of the cutting blade housing 31, and connected at a rear end thereof to the left side rear swing link 24 through an action of a linking pin 24a connecting the rear swing link 24 to the rear linking bracket 35 of the cutting blade housing 31 is provided, and a link 25 connected at a front end thereof to the right side front swing link 22 through an action of a linking pin 22a connecting the front swing link 22 in such a manner as to be capable of freely rotating to the front linking bracket 34 of the cutting blade housing 31, and connected at a rear end thereof to the right side rear swing link 24 through an action of a linking pin 24a connecting the rear swing link 24 in such a manner as to be capable of freely rotating to the rear linking bracket 35 of the cutting blade housing 31 is provided.

Figure 4:
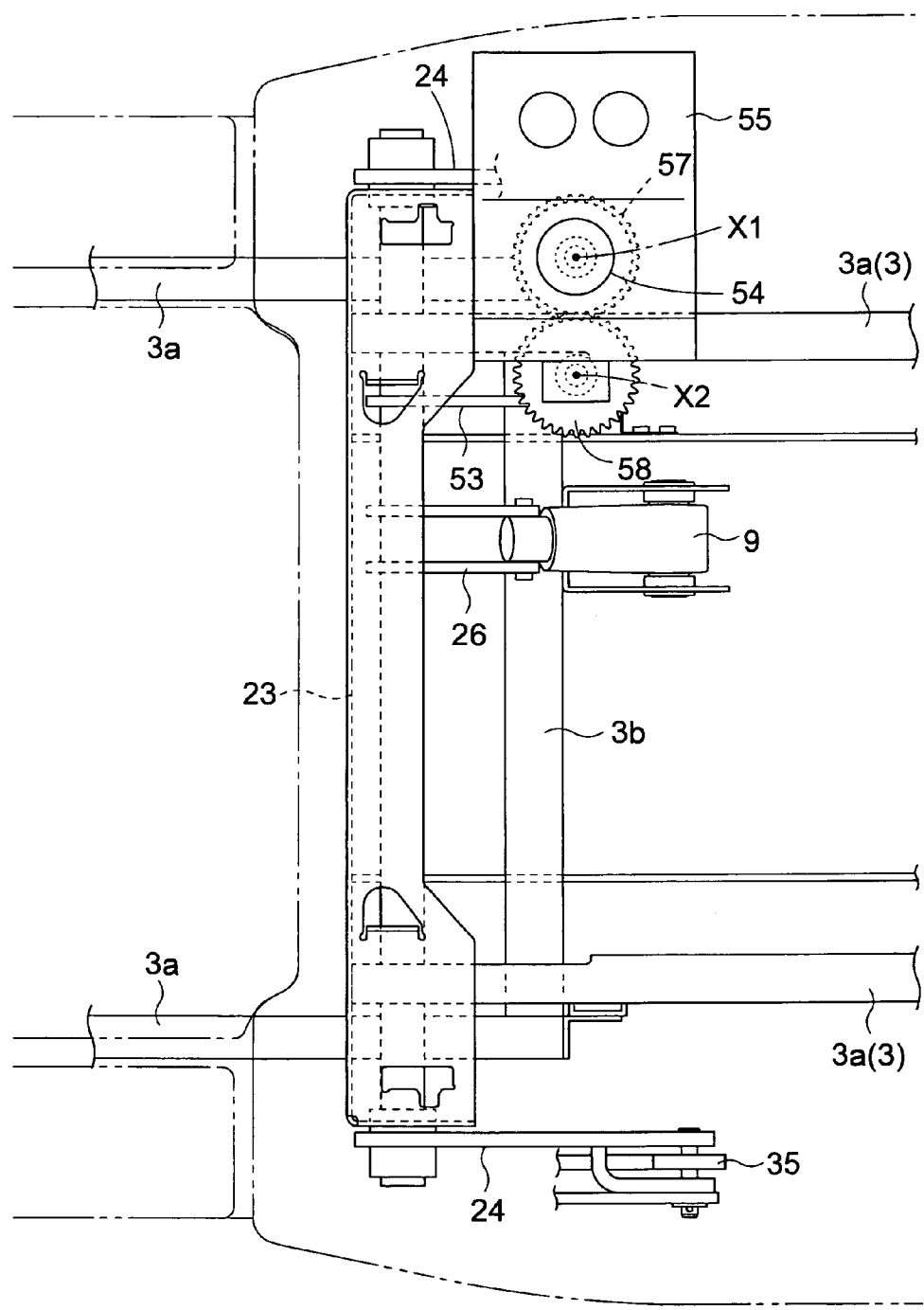
FIG. 4 is a plan view of an arrangement section of an elevation cylinder and a lower limit adjustment element.

As shown in FIG. 3 and FIG. 4, a link drive arm 26 extends towards the rear of the chassis from a section of the rotating shaft 23 of the rear swing links 24 disposed between a pair of left and right chassis main frames 3a, and the cylinder rod of the elevation cylinder 9 is connected to the link drive arm 26.

As a result, the link mechanism 20 connects the mower unit 30 to the frame 3 in such a manner as to be capable of freely moving upwards and downwards. The elevation cylinder 9 connects the link mechanism 20 to the cutting blade housing 31 of the mower unit 30 as a linking mechanism such that the mower unit 30 can be raised and lowered. That is to say, by extending and contracting, the elevation cylinder 9 rotates the rotating shaft 23 through an action of the link drive arm 26 and swings the left and right rear swing links 24 upward and downward with respect to the frame 3, and using the left and right rear swing links 24, swings the left and right front swing links 22 upward and downward with respect to the frame 3 through an action of the link 25, raising and lowering the mower unit 30 with respect to the self-propelled chassis.

Figure 5:
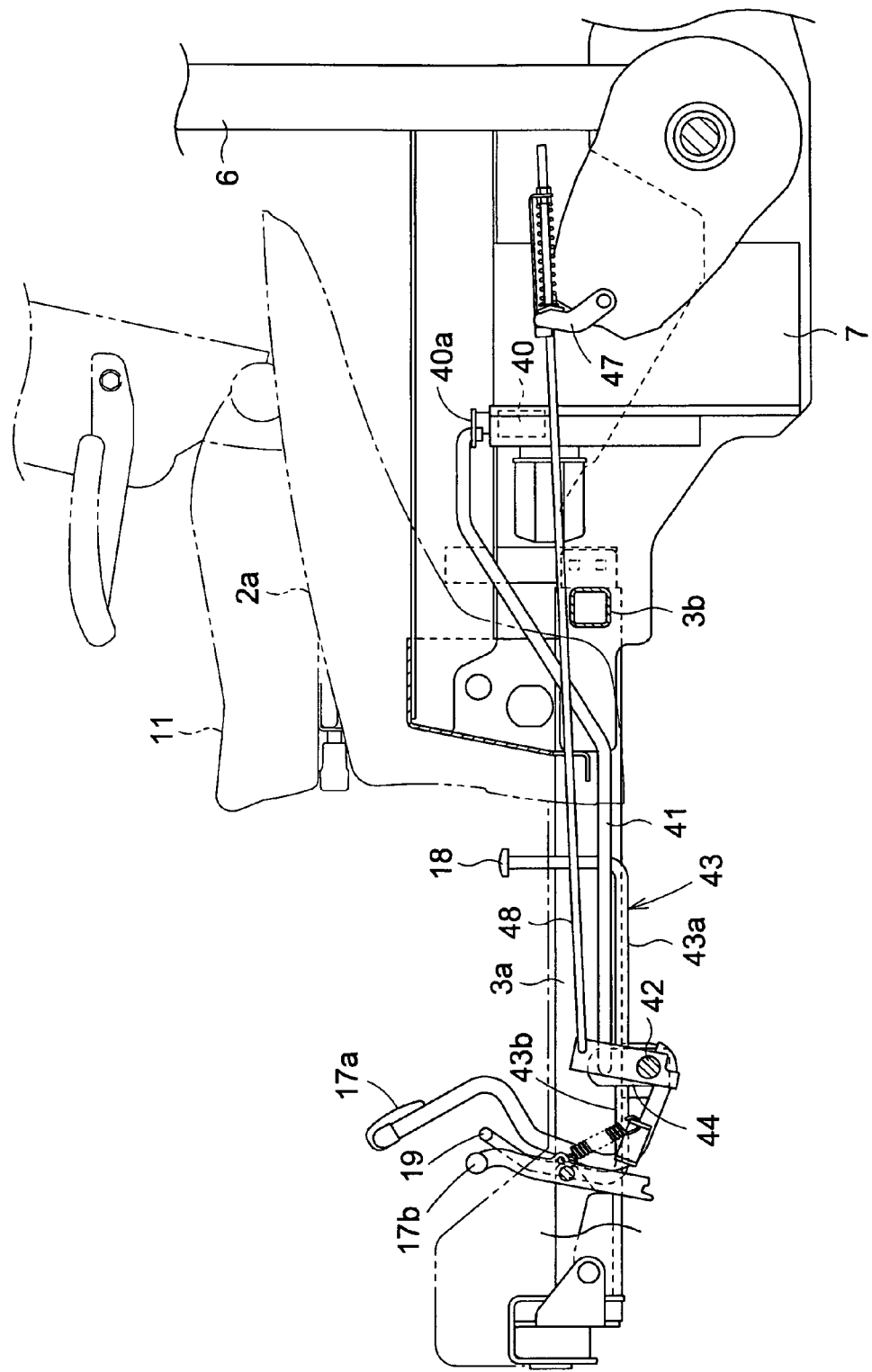
FIG. 5 is a side view showing a linking condition of a raising pedal, a lowering pedal, and an elevation valve.
Figure 6:
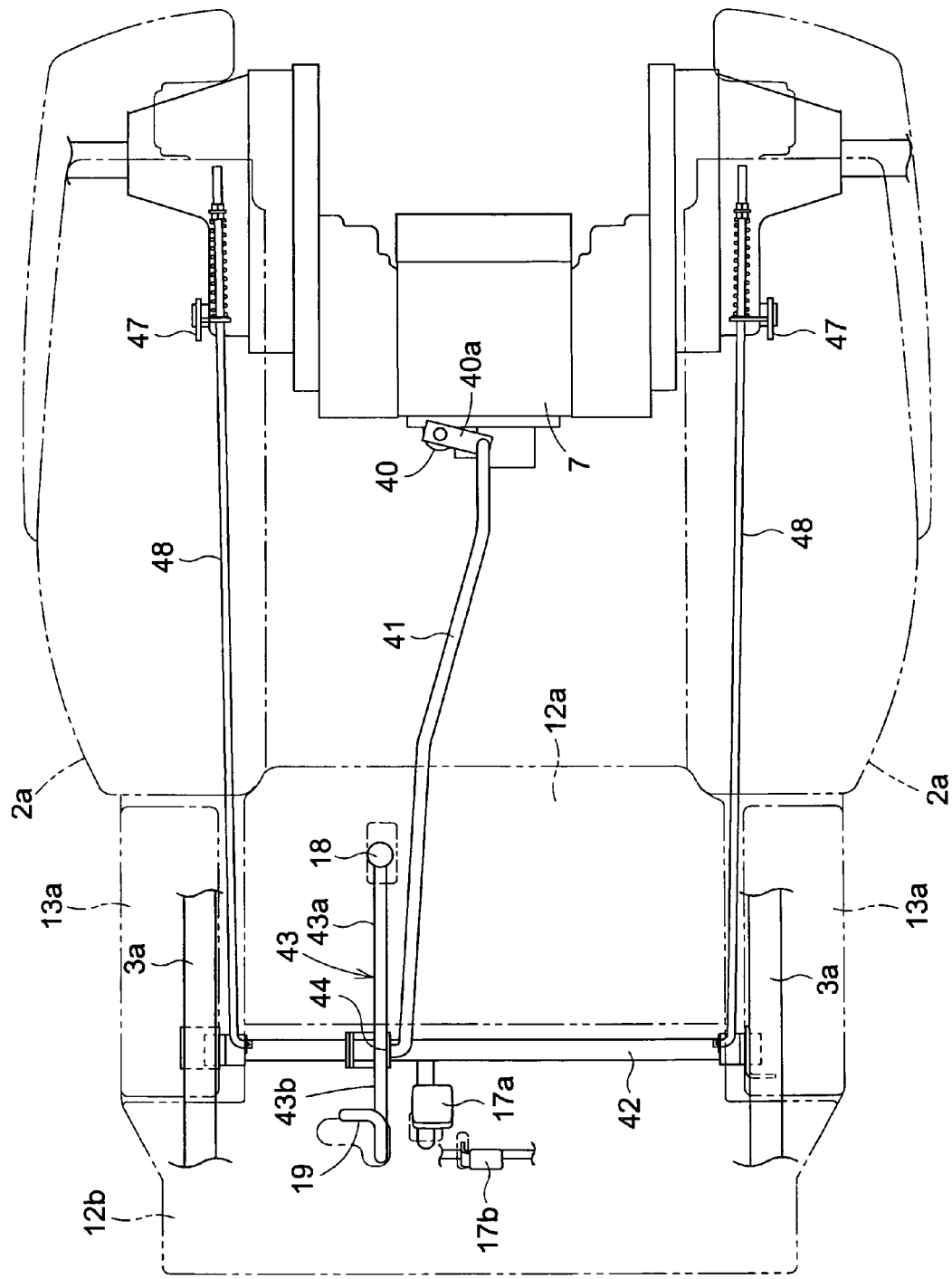
FIG. 6 is a plan view showing a linking condition of a raising pedal, a lowering pedal, and an elevation valve.
Figure 7:
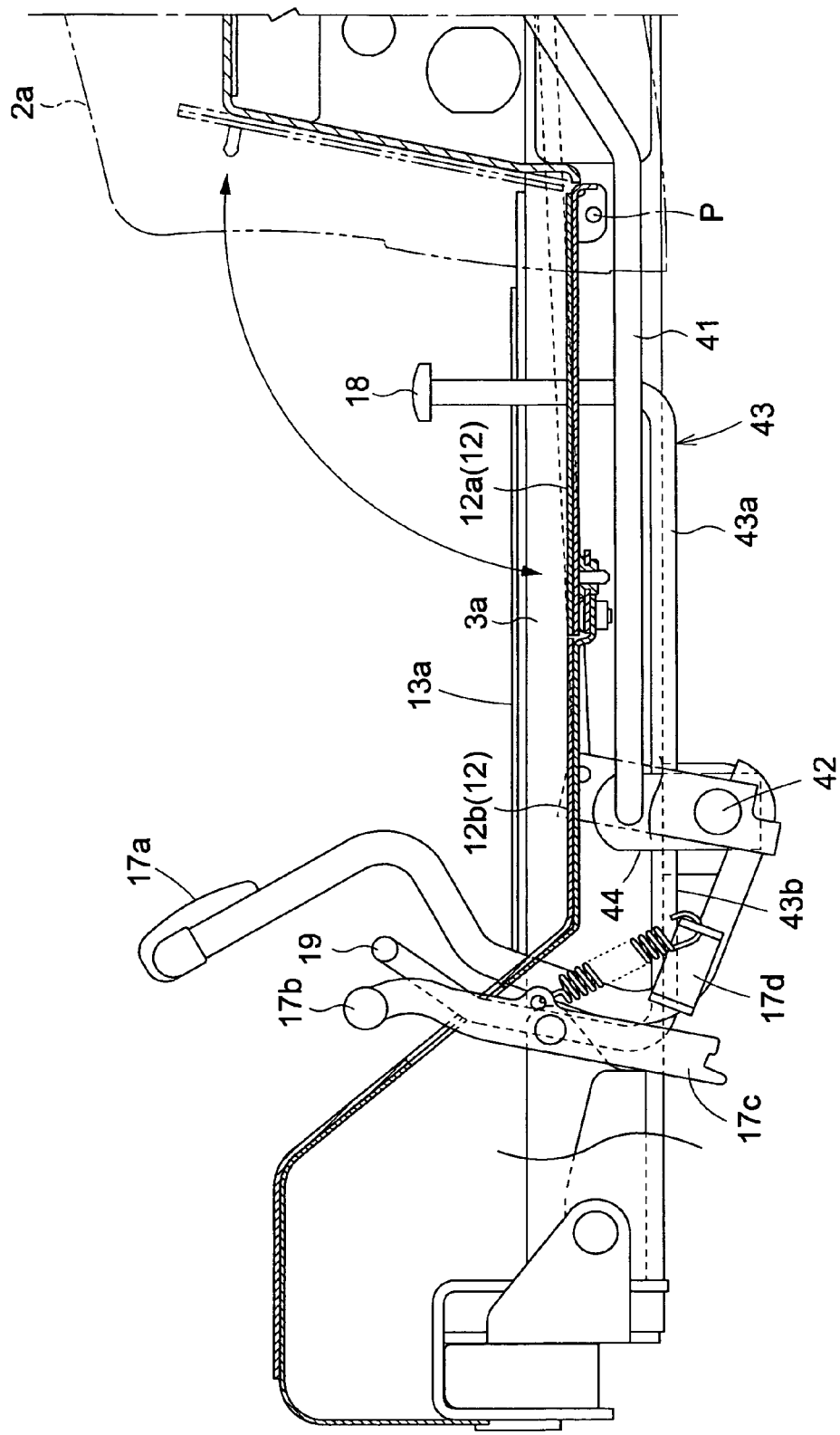
FIG. 7 is a side view showing an opening-closing structure of an opening-closing driving section floor.

As shown in FIG. 5, FIG. 6, and FIG. 7, an elevation valve 40 connected to a supply and removal port of the elevation cylinder 9 through an action of a hydraulic hose (not shown) is provided at a front section of the transmission case 7 in order to operate the elevation cylinder 9, and an operation arm 40a capable of freely swinging about a shaft of the elevation valve 40 oriented in a vertical direction of the chassis is linked to the raising pedal 18 and the lowering pedal 19 disposed in the riding driving section 10 through an action of a link rod 41 etc.

As shown in FIG. 6 and FIG. 7, the raising pedal 18 is supported by a rear arm section 43a, of a pedal arm 43, extending towards the rear of the chassis from a pedal shaft 42, wherein the pedal shaft 42 is supported below the driving section floor 12 in a transverse direction of the chassis by the left and right chassis main frames 3a in such a manner as to be capable of freely rotating, and the pedal arm 43 is supported at a center section thereof by the pedal shaft 42 in such a manner as to be capable of freely rotating with respect to the pedal shaft 42. The lowering pedal 19 is supported by a rear arm section 43b, of the pedal arm 43, extending towards the front of the chassis from the pedal shaft 42. The pedal shaft 42 supports the brake pedal 17a in such a manner as to be capable of freely rotating as one with the pedal shaft 42. The pedal shaft 42 is linked to left and right driving brake operation sections 17 disposed in the transmission case 7 by a link rod 48, linking the brake pedal 17a to both of the driving brake operation sections 17.

As shown in FIG. 6 and FIG. 7 etc., a front end side of the link rod 41 is connected to the mounting member 44 in such a manner as to be capable of freely rotating with respect to a mounting member 44, wherein the mounting member 44 facilitates the supporting of the pedal arm 43 by the pedal shaft 42 in such a manner as to be capable of freely rotating relative to the pedal shaft 42, and rotates relative to the pedal shaft 42 together with the pedal arm 43. A rear end side of the link rod 41 is connected to the operation arm 40a of the elevation valve 40 in such a manner as to be capable of freely rotating with respect to the operation arm 40a.

As a result, both the raising pedal 18 and the lowering pedal 19 are supported by the same pedal arm 43 in such a manner as to be capable of freely rotating as one. The raising pedal 18, as a result of pressing-down thereof, swings downwards about an axis of the pedal shaft 42, rotates the mounting member 44 in one direction, transfers the operation force thereof to the operation arm 40a of the elevation valve 40 using the link rod 41, and switches the elevation valve 40 from a neutral condition to a raising condition. Furthermore, the lowering pedal 19, as a result of pressing-down thereof, swings downwards about an axis of the pedal shaft 42, rotates the mounting member 44 in the other direction, transfers the operation force thereof to the operation arm 40a of the elevation valve 40 using the link rod 41, and switches the elevation valve 40 from a neutral condition to a lowering condition. Both the raising pedal 18 and the lowering pedal 19, as a result of cancellation of the pressing-down operation, return independently to the non-operation conditions thereof and restore the elevation valve 40 to the neutral position thereof as a result of a neutral restoration force provided such that the elevation valve 40 can return independently to the neutral position.

Figure 8:
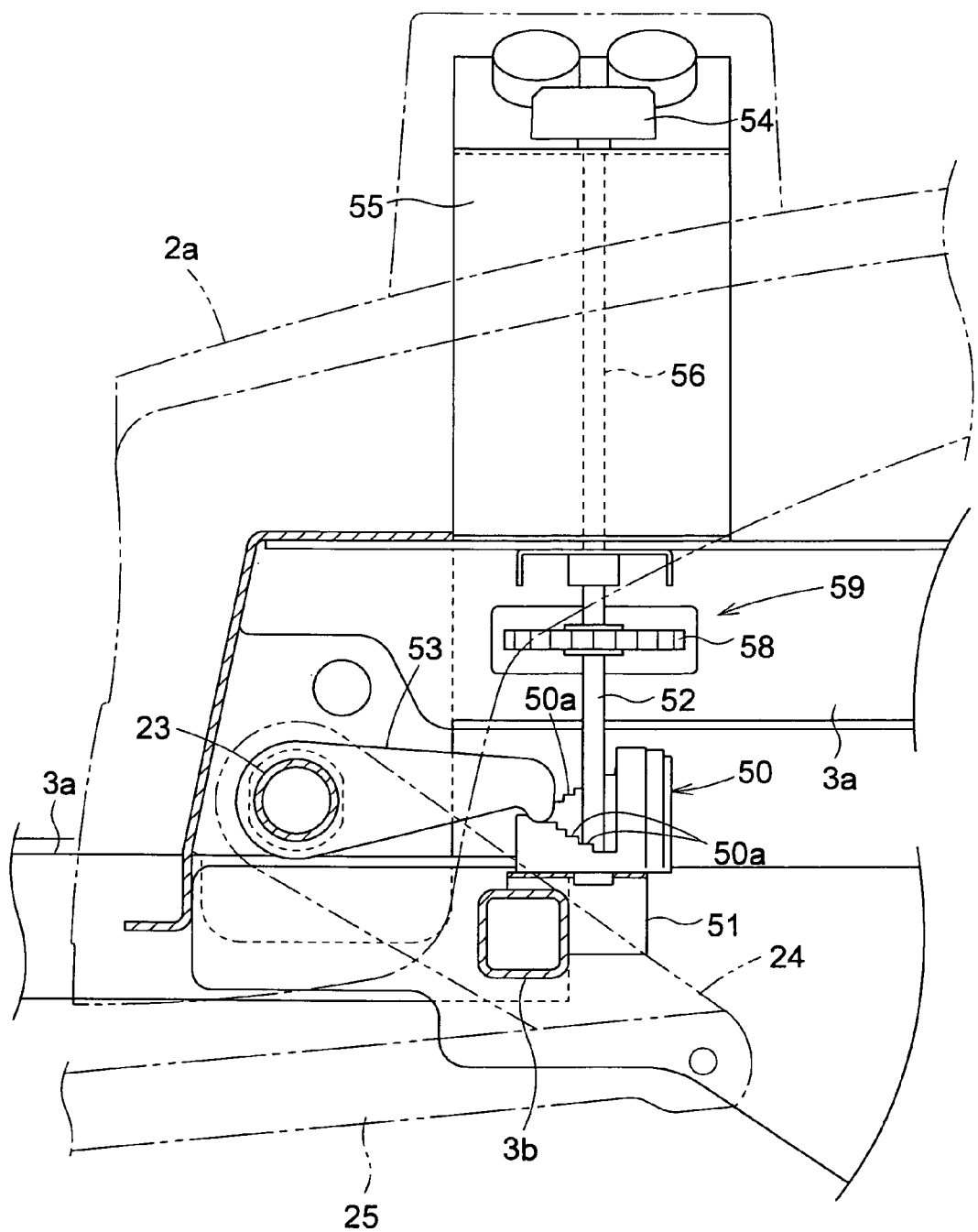
FIG. 8 is a side view showing an arrangement section of a stopper.
Figure 9:
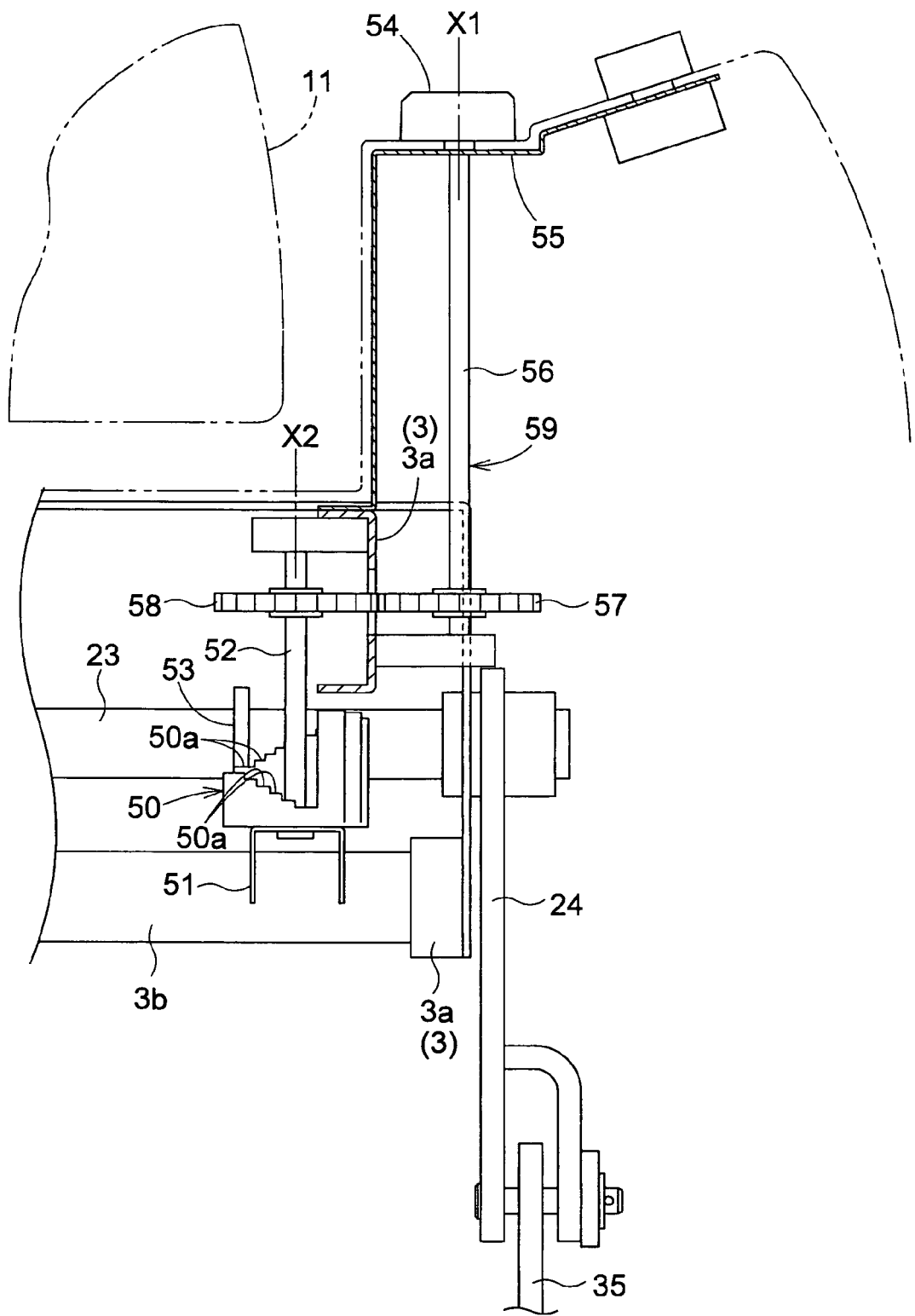
FIG. 9 is a rear view of an adjustment linking mechanism.
Figure 10:
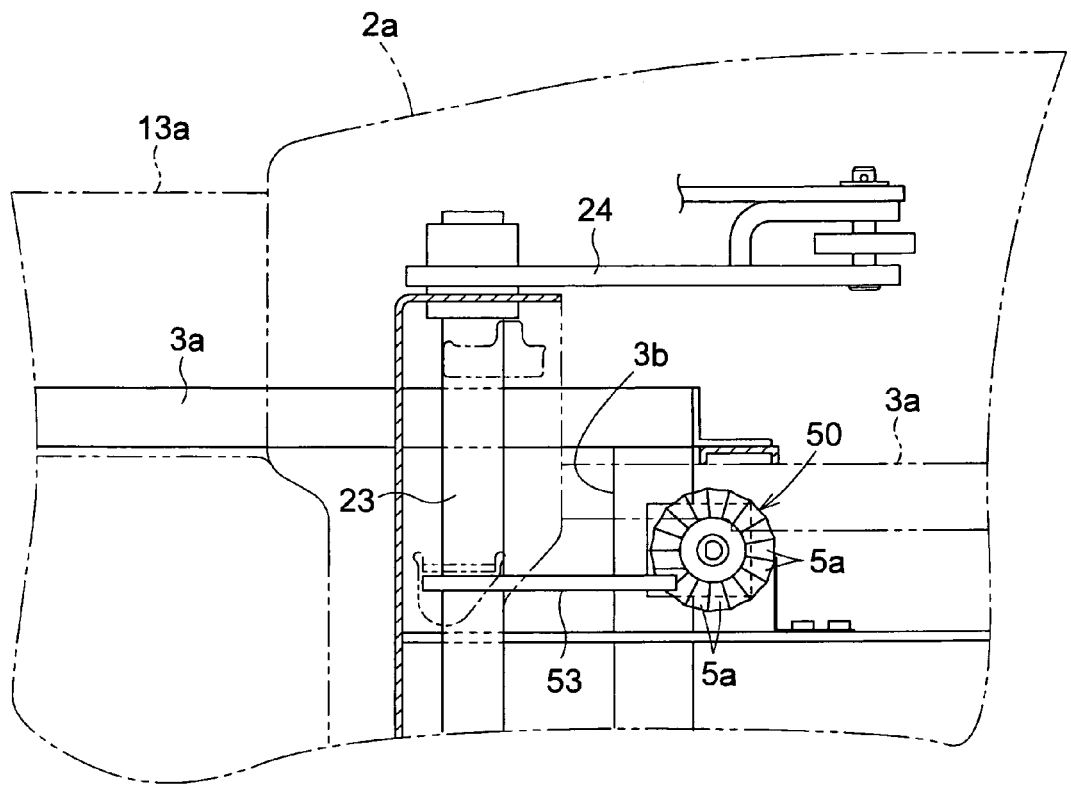
FIG. 10 is a plan view of a stopper arrangement section.

As shown in FIG. 8, FIG. 9, and FIG. 10, a stopper 50 of an approximately circular shape when viewed from above or below the chassis is provided at a position more towards the inside of the chassis than one of the chassis main frames 3a. The stopper 50 is supported through an action of a rotating shaft 52 by a support bracket 51 of a link frame 3b connected to the left and right chassis main frames 3a, and furthermore, a plurality of stopper surfaces 50a are provided circumferentially side-by-side on an upper surface side of the stopper 50. A lowering restraint arm (restraint arm) 53 connected to the rotating shaft 23 of the rear swing links 24 in such a manner as to be capable of freely rotating as one therewith and swinging downward about an axis of the rotating shaft 23 pursuant to lowering of the mower unit 30 by the elevation cylinder 9 and rotation of the rotating shaft 23 is caught and supported by one of the plurality of stopper surfaces 50a. Accordingly, the stopper 50 acts to stop the lowering restraint arm 53 through an action of one of the stopper surfaces 50a, setting a rotation limit of the rotating shaft 52, and as a result, the stopper 50 sets a downward motion limit of the rear swing links 24 and the front swing links 22, setting a downward motion limit of the mower unit 30 by the elevation cylinder 9.

As clearly shown in FIG. 8 and FIG. 9, the plurality of stopper surfaces 50a of the stopper 50 are disposed in a stepwise format such that a height (above-ground height) from each stopper surface 50a to the support bracket 51 is different. The stopper 50 is supported in such a manner as to be capable of freely rotating with respect to the support bracket 51 together with the rotating shaft 52 oriented in a vertical direction of the chassis, and is configured so as to be capable of being adjusted through rotation by, as shown in FIG. 2 and FIG. 4, a lower limit adjustment element 54 provided at a side of the driving seat 11 of the riding driving section 10 and more towards the outside of the chassis than one of the chassis main frames 3a.

That is to say, as shown in FIG. 8 and FIG. 9 etc., the lower limit adjustment element 54 is supported through an action of a rotating shaft 56 in such a manner as to be capable of freely rotating on an upper surface side of a control panel 55 supported by one of the chassis main frames 3a.

An adjustment linking mechanism 59 configured so as to be linked to the lower limit adjustment element 54 and the stopper 50 comprises the rotating shaft 56, a link gear 57 provided at a lower end side of the rotating shaft 56, and a rotation gear 58 provided in such a manner as to be capable of freely rotating as one with the stopper 50 through the support thereof on an upper end side of the rotating shaft 52 of the stopper 50 in such a manner as to be capable of freely rotating as one with the rotating shaft 52.

The link gear 57 is connected to the rotating shaft 56 in such a manner as to be capable of freely rotating as one therewith, and the rotating shaft 56 is connected to the lower limit adjustment element 54 as a linking rotating shaft in such a manner as to be capable of freely rotating as one therewith. The link gear 57 and the rotation gear 58 are mutually engaged and rotate in a mutually linked manner.

That is to say, the stopper 50 is disposed more towards the inside of the chassis than the chassis main frames 3a in order to act upon the rotating shaft 23 of the rear swing links 24 within the link mechanism 20; the lower limit adjustment element 54 is disposed more towards the outside of the chassis than the chassis main frames 3a in order to be positioned at a side of the driving seat 11; and the lower limit adjustment element 54 and the stopper 50 are disposed such that an axis of rotation X1 oriented in a vertical direction of the chassis and constituted by the axis of the rotating shaft 56 of the lower limit adjustment element 54 and an axis of rotation X2 oriented in a vertical direction of the chassis and constituted by the axis of the rotating shaft 52 of the stopper 50 are in an eccentric condition. For this reason, the adjustment linking mechanism 59 links the lower limit adjustment element 54 and the stopper 50 while permitting the eccentricity of the axis of rotation X1 of the lower limit adjustment element 54 and the axis of rotation X2 of the stopper 50 through the linking of the rotation gear 58 and the link gear 57.

Accordingly, when the lower limit adjustment element 54 is rotated about the axis of rotation X1, the operation force thereof is transferred to the rotating shaft 52 of the stopper 50 by the adjustment linking mechanism 59; the stopper 50 rotates about the axis of rotation X2 in a rotation direction corresponding to a rotation direction of the lower limit adjustment element 54 and through a rotation angle corresponding exactly to a rotation angle of the lower limit adjustment element 54; and among the plurality of stopper surfaces 50a, the stopper surface 50a corresponding to the operation position of the lower limit adjustment element 54 is adjusted through rotation to a mounting condition wherein the stopper surface 50a acts upon the lowering restraint arm 53.

That is to say, when the grass or lawn cutting height is to be changed during the execution of grass cutting or lawn cutting operations, by adjusting a mounting height of gauge wheel shafts 32a (see FIG. 3) of the front and rear gauge wheels 32 with respect to brackets 36, the mounting height of each gauge wheel 32 with respect to the cutting blade housing 31 is set to a suitable mounting height corresponding to the desired cutting height of the lawn or grass. Then, the lower limit adjustment element 54 is rotated and the stopper 50 is adjusted through rotation to a suitable mounting condition wherein among the stopper surfaces 50a of the stopper 50, the stopper surface 50a corresponding to the set mounting height of the gauge wheels 32 acts. Then, when the lowering pedal 19 is pressed down, the elevation valve 40 is switched from the neutral condition to the lowering condition and the elevation cylinder 9 operates towards a contraction side as a result of the operating force thereof, the elevation cylinder 9 swings the link mechanism 20 to a downward side, lowering the mower unit 30, and the mower unit 30 adopts a lowered operation condition in contact with a ground surface through the front and rear gauge wheels 32. At this time, the stopper 50 acts to stop the lowering restraint arm 53 through an action of the stopper surface 50a selected through rotation of the lower limit adjustment element 54, and lowering of the mower unit 30 by the elevation cylinder 9 is stopped in accordance with the fact that the elevation cylinder 9 has lowered the mower unit 30 to the downward motion limit. As a result, the linking pins 22a connecting the left and right front swing links 22 to the front linking bracket 34 of the cutting blade housing 31 are positioned at an upper section side or an upper end of long pin holes 34a (see FIG. 3) of the front linking bracket 34, and the linking pins 24a connecting the left and right rear swing links 24 to the rear linking bracket 35 of the cutting blade housing 31 are positioned at an upper section side or an upper end of long pin holes 35a (see FIG. 3) of the rear linking bracket 35, and therefore, when the front and rear gauge wheels 32 or a ride-over roller 37 (see FIG. 3) of the mower unit 30 travel onto a protrusion in the ground surface or an obstacle, the mowing operation can continue as the mower unit 30 is capable of moving upwards with respect to the left and right front swing links 22 and rear swing links 24 in order to be raised with respect to the self-propelled chassis by the lifting operation of the ground.

When relocating or cornering, the raising pedal 18 is pressed downward. As a result, the elevation valve 40 is switched from the neutral condition to the raising condition and the elevation cylinder 9 is operated towards an extension side as a result of the operating force thereof, the elevation cylinder 9 swings the link mechanism 20 to an upward side and raises the mower unit 30, and the mower unit 30 adopts a raised non-operation condition wherein the front and rear gauge wheels 32 are raised up from the ground surface.

As shown in FIG. 6 etc., the raising pedal 18 and the lowering pedal 19 are disposed on the side opposite to the parking brake pedal 17b with respect to the brake pedal 17a of the driving section floor 12, and in a distributed condition at a front side and rear side of the chassis. More specifically, as shown in FIG. 2, when viewed from above or below the chassis, the raising pedal 18 and the lowering pedal 19 are disposed in a distributed condition with respect to a fore-and-aft direction of the chassis wherein the raising pedal 18 is lined up with the driver access openings 13 in a transverse direction of the chassis, and the lowering pedal 19 is displaced from the raising pedal 18 towards a front side of the chassis and disposed slightly closer to a front side of the chassis than the driver access openings 13.

That is to say, each of the raising pedal 18 and the lowering pedal 19 are operated by a single foot. However, as the lowering pedal 19 is operated closer to a front side than the raising pedal 18 and the raising pedal 18 is operated closer to a rear side than the lowering pedal 19, pedal operations are performed with little possibility of incorrect operation occurring as a result of operating a pedal other than that intended. Furthermore, when getting on or off via the driver access openings 13, a situation wherein the lowering pedal 19 is mistakenly pressed down and the mower unit 30 is lowered is less likely to occur than a situation wherein the raising pedal 18 is mistakenly pressed down and the mower unit 30 is raised.

As shown in FIG. 2, the driving section floor 12 is partitioned into an opening-closing driving section floor 12a and a fixed driving section floor 12b by a partition line B1 passing between the raising pedal 18 and the lowering pedal 19 in a transverse direction of the chassis and partition lines B2 disposed in a fore-and-aft direction of the chassis on an inner side with respect to the driver steps 31a. As shown in FIG. 7, the opening-closing driving section floor 12a is supported in such a manner as to be capable of freely opening and closing by swinging upwards and downwards about an axis P disposed in a transverse direction of the chassis in an end section of the opening-closing driving section floor 12a positioned towards the rear of the chassis.

That is to say, by raising and opening the opening-closing driving section floor 12a, the section below the driving section floor is opened and the upper surface side of the cutting blade housing 31 can be inspected and repaired from the upper side of the self-propelled chassis via the installation space of the opening-closing driving section floor 12a.

Figure 12:
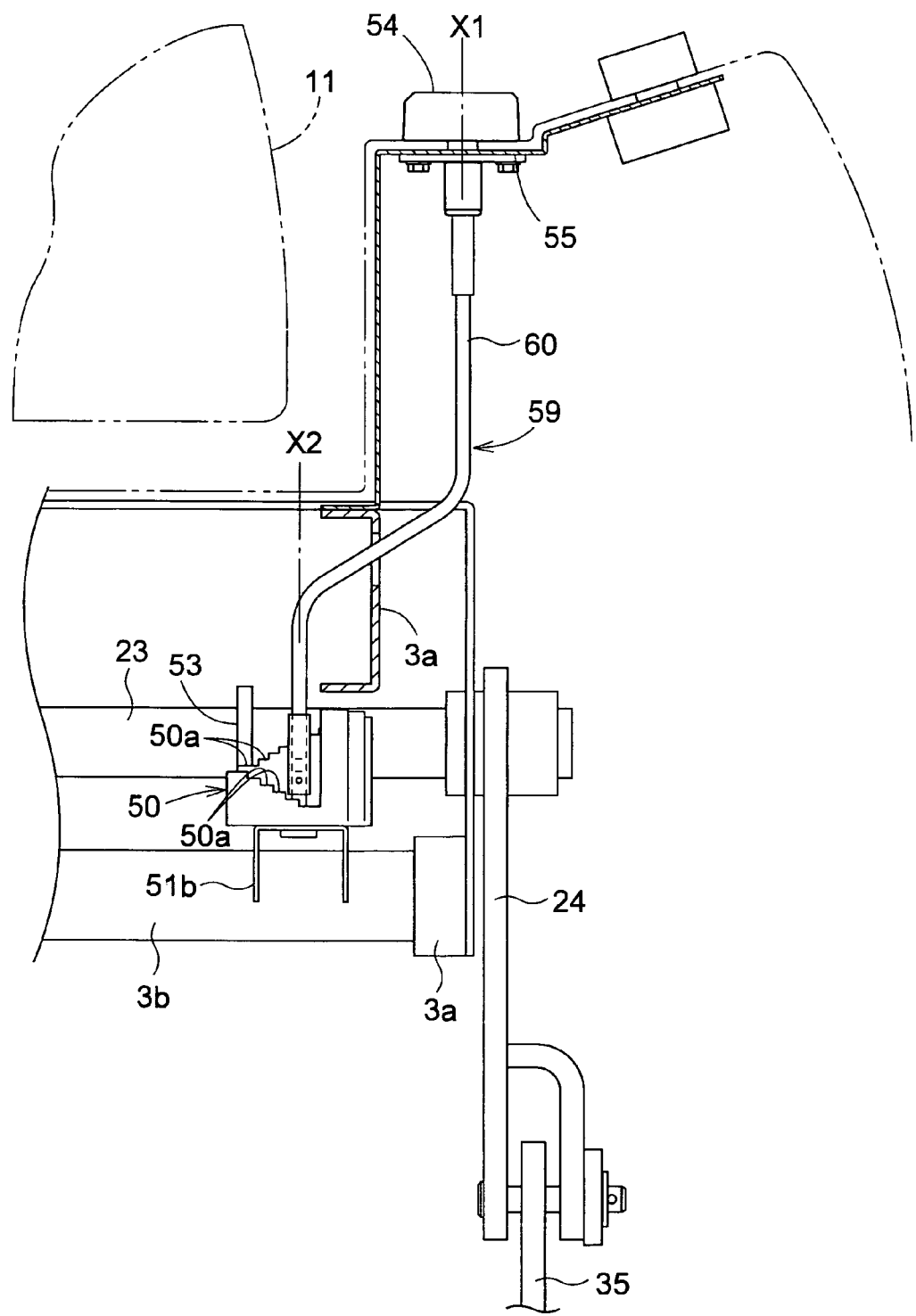
FIG. 12 is a rear view of an adjustment linking mechanism according to another embodiment.

FIG. 12 shows an adjustment linking mechanism 59 according to another embodiment. The adjustment linking mechanism 59 is configured so as to provide a flexible drive cable 60 linked at one end side thereof to the stopper 50 in such a manner as to be capable of freely rotating as one with the stopper 50 and linked at the other end side thereof to the lower limit adjustment element 54 in such a manner as to be capable of freely rotating as one with the lower limit adjustment element 54; the stopper 50 and the lower limit adjustment element 54 are linked as a result of a linking action of the flexible drive cable 60; and the eccentricity of the axis of rotation X2 of the stopper 50 and the axis of rotation X1 of the lower limit adjustment element 54 is permitted through flexure of the flexible drive cable 60. The flexible drive cable 60 passes through a penetration of the chassis main frame 3a.

Figure 13:
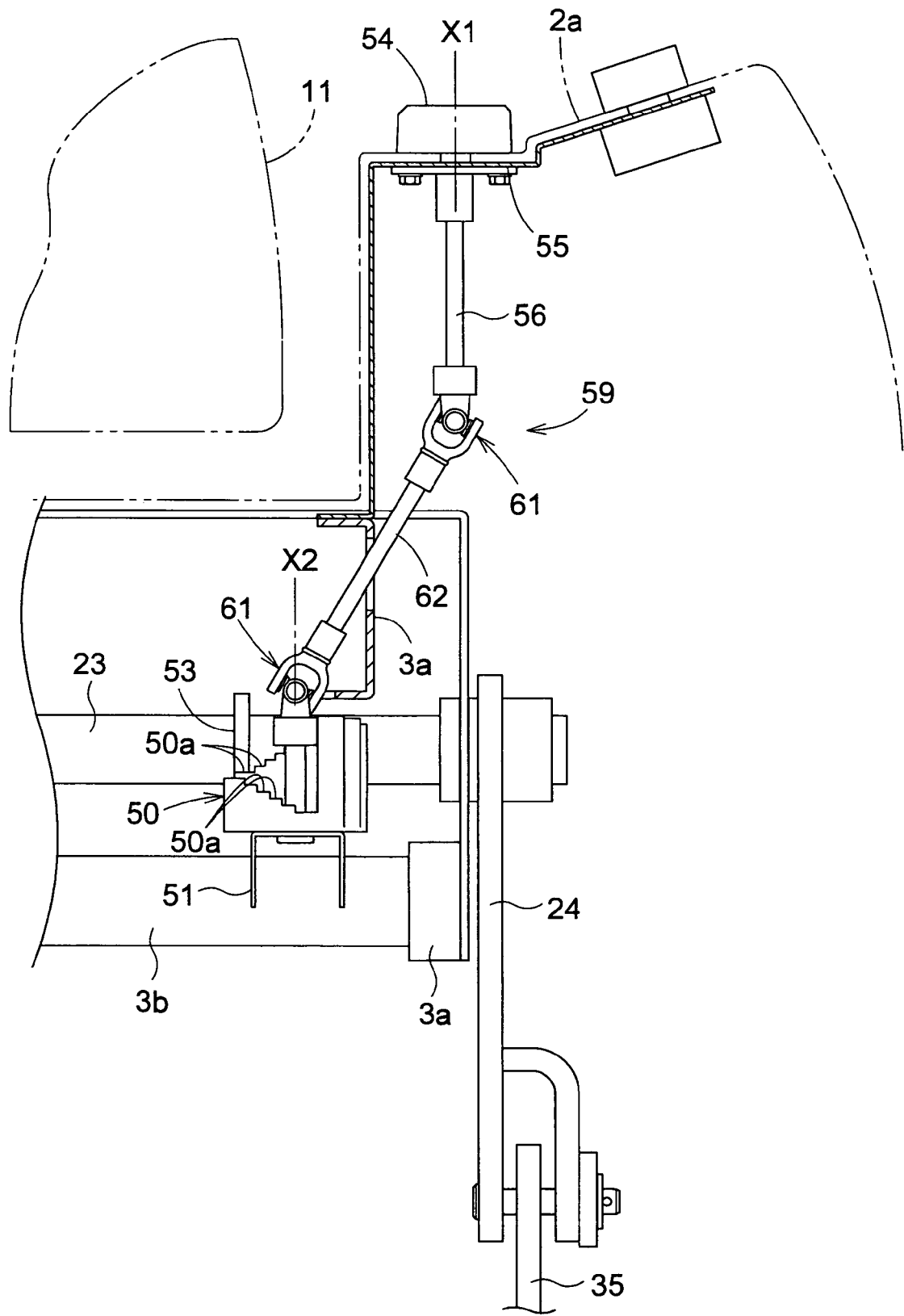
FIG. 13 is a rear view of an adjustment linking mechanism according to another embodiment.

FIG. 13 shows an adjustment linking mechanism 59 according to yet another embodiment. The adjustment linking mechanism 59 is configured so as to provide a rotating shaft 62 linked at one end side thereof to the stopper 50 through an action of a universal joint 61 and linked at the other end side thereof to the rotating shaft 56 of the lower limit adjustment element 54 through an action of a universal joint 61; the stopper 50 and the lower limit adjustment element 54 are linked as a result of a linking action of the universal joints 61 and the rotating shaft 62; and the eccentricity of the axis of rotation X2 of the stopper 50 and the axis of rotation X1 of the lower limit adjustment element 54 is permitted through flexure of the universal joints 61. The rotating shaft 62 passes through a penetration of the chassis main frame 3a.

Figure 14:
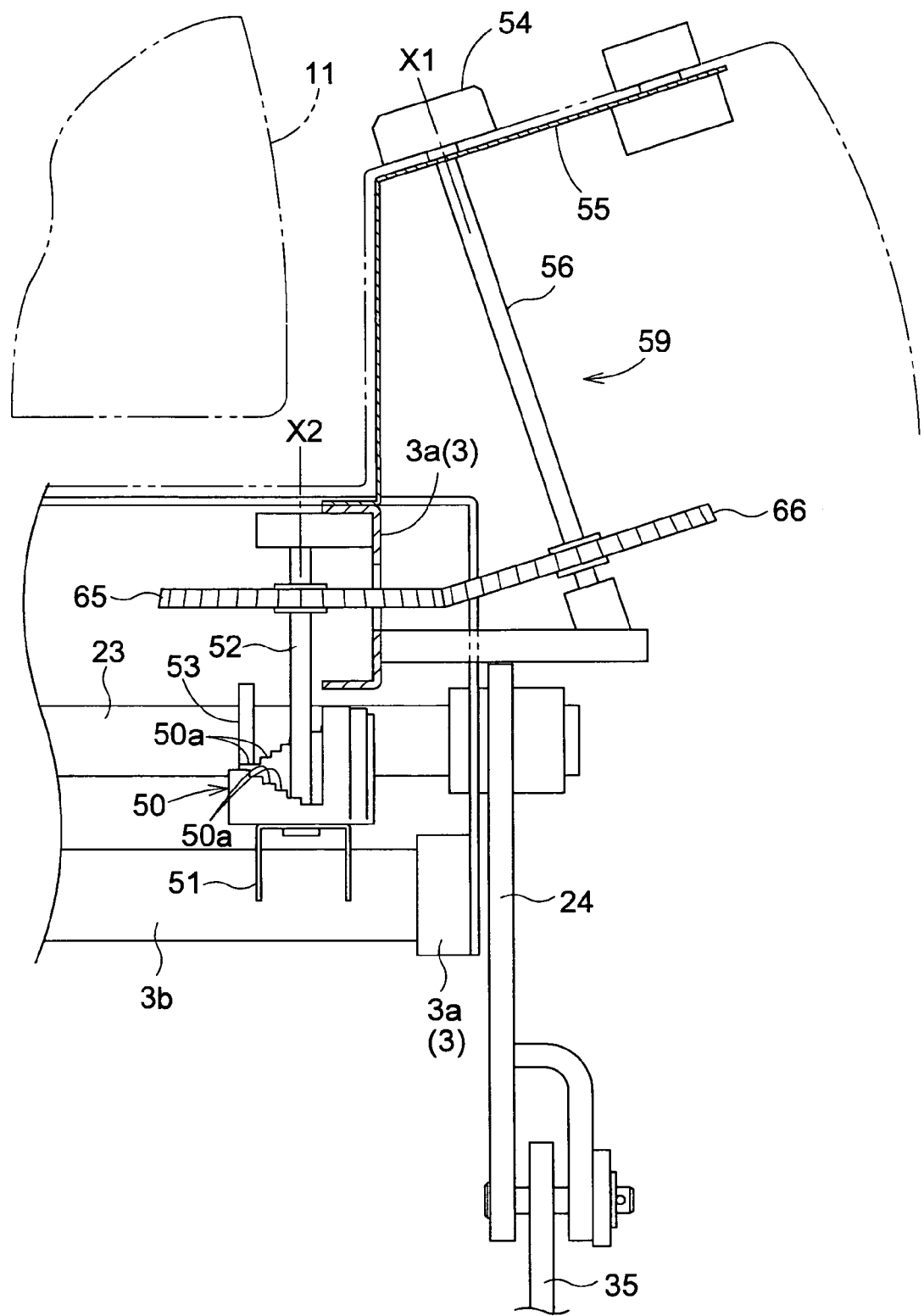
FIG. 14 is a rear view of an adjustment linking mechanism according to another embodiment.

FIG. 14 shows an adjustment linking mechanism 59 according to yet another embodiment. The adjustment linking mechanism 59 is configured having a stopper-side bevel gear shaped rotating gear 65 provided in such a manner as to be capable of freely rotating as one with the rotating shaft 52 of the stopper 50, a bevel gear shaped drive gear 66 on the adjustment element side mutually engaging with the rotating gear 65, and a rotating shaft 56 of the lower limit adjustment element 54 provided as a rotating shaft linking the drive gear 66 to the lower limit adjustment element 54. Through an action of the bevel gear shaped transmission gears 65 and 66, the adjustment linking mechanism 59 enables the axis of rotation X1 of the lower limit adjustment element 54 to be disposed at a position displaced from the axis of rotation X2 of the stopper 50 towards an outer side with respect to the driving seat 11 and to be inclined with respect to the axis of rotation X2 of the stopper 50, and the adjustment linking mechanism 59 links the stopper 50 and the lower limit adjustment element 54.

Figure 15:
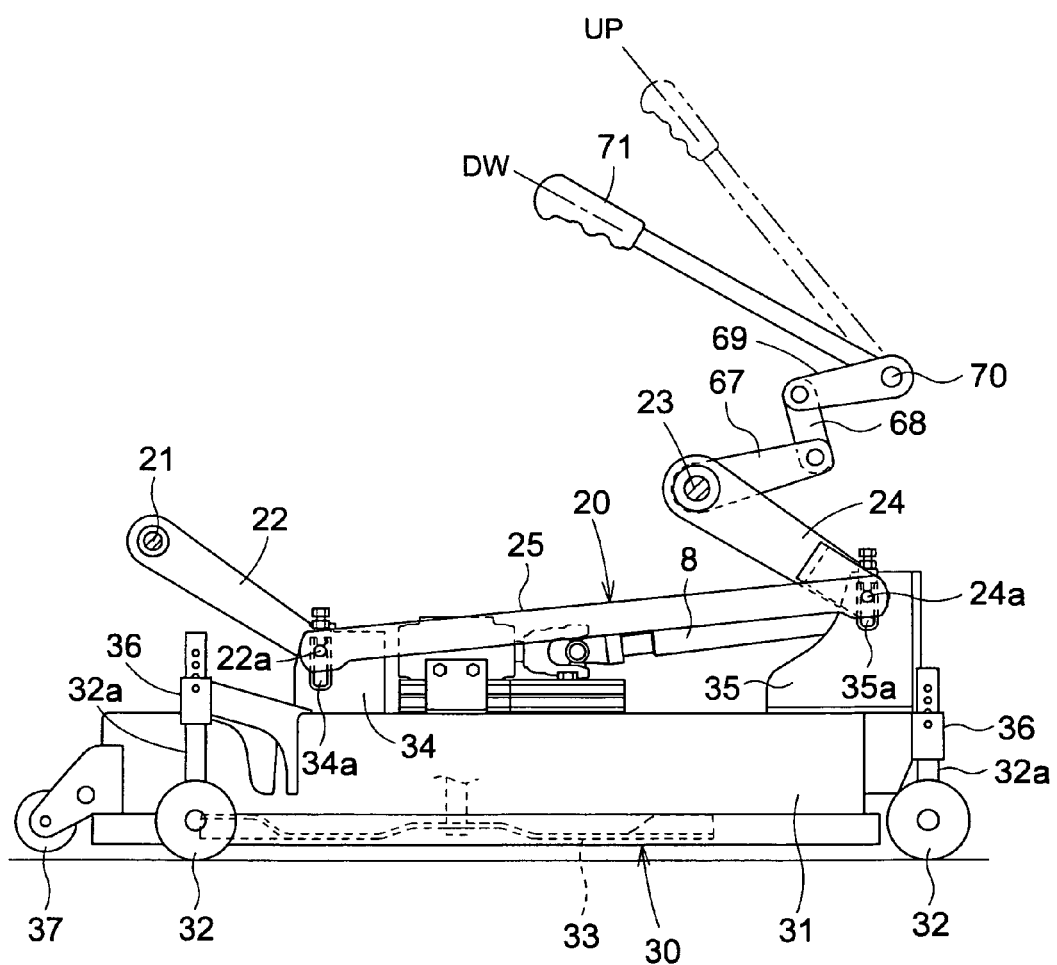
FIG. 15 is a side view of an elevation operation device according to another embodiment.

FIG. 15 is a side view of an elevation operation device according to another embodiment, for raising and lowering a mower unit 30. As shown in this figure, the elevation operation device has an operation arm 67 provided on the rotating shaft 23 of the rear swing links 24 in such a manner as to be capable of freely rotating as one with the rotating shaft 23, a swing arm 69 linked to the operation arm 67 through an action of an auxiliary link 68, and an elevation lever 71 extending from a rotating shaft 70 of the swing arm 69.

That is to say, the elevation lever 71 is lowered manually about an axis of the rotating shaft 70 to a "Lower" position. As a result, the rotating shaft 70 rotates, the swing arm 69 swings downwards, and the rotating shaft 23 rotates through an action of the auxiliary link 68 and the operation arm 67. The front swing links 22 swing downwards pursuant to the resultant downward swinging of the rear swing links 24, and the mower unit 30 is lowered.

Alternatively, the elevation lever 71 is raised manually about the axis of the rotating shaft 70 to a "Raise" position. As a result, the rotating shaft 70 rotates, the swing arm 69 swings upwards, and the rotating shaft 23 rotates through an action of the auxiliary link 68 and the operation arm 67. The front swing links 22 swing upwards pursuant to the resultant upward swinging of the rear swing links 24, and the mower unit 30 is raised.

Other Embodiment

As an alternative to the configuration of the mower unit 30 in accordance with the above-described embodiments such that the mower unit 30 is raised and lowered by an elevation cylinder 9, embodiments configured so as to perform raising and lowering using hydraulic motors and various other kinds of actuators also accomplish the object of the present invention. Therefore, the elevation cylinder 9, a hydraulic motor, and the elevation lever 71, etc. are commonly referred to as the operation mechanisms 9, 71.

In lieu of the link mechanism, other suspension mechanisms such as one utilizing chains may be used with the present invention.

What is claimed is:

1. A riding type mower comprising:
a chassis having chassis main frames;
a plurality of wheels including at least one driven wheel;
a vehicle body supported by the plurality of wheels;
a driver's seat supported by the vehicle body;
a mower unit located below the vehicle body;
a suspension mechanism for vertically movably supporting the mower unit from the vehicle body, the suspension mechanism having a restraint member operatively connected to the suspension mechanism;
an operation mechanism for operating the suspension mechanism;
a stopper for setting a lower limit for a vertical position of the mower unit to define a cutting height by abutment against the restraint member, the stopper is adapted to be rotated to change the lower limit and disposed more towards an inside of the chassis than the chassis main frames under the driver's seat;
a lower limit adjustment element located laterally of the driver's seat and rotatable to rotate the stopper;
a linking mechanism for operatively connecting the lower limit adjustment element with the stopper;
wherein the lower limit adjustment element is rotatable about a first axis extending vertically and the stopper is rotatable about a second axis extending vertically, wherein the first axis is displaced with respect to the second axis and the linking mechanism transmits a rotating motion about the first axis as a rotating motion about the second axis, the first axis being disposed more towards a lateral outside of the chassis than the second axis.

2. A riding type mower according to claim 1, wherein the linking mechanism has a rotating gear rotatable with the stopper and a link gear in engagement with the rotating gear, and a rotating shaft connecting the link gear with the lower limit adjustment element to rotate in unison with the link gear.

3. A riding type mower according to claim 1, wherein the linking mechanism includes a flexible cable.

4. A riding type mower according to claim 1, wherein the linking mechanism includes a universal joint.

5. A riding type mower according to claim 1, wherein the lower limit adjustment element is located on a fender.

6. A riding type mower according to claim 1, wherein the lower limit adjustment element is located between a forward end and a rear end of the driver's seat in a fore-and-aft direction.

7. A riding type mower according to claim 1, wherein the stopper has upwardly facing abutment surfaces that abut against the restraint member.

8. A riding type mower according to claim 1, wherein the lower limit adjustment element is disposed more towards the outside of the chassis than the chassis main frames at a side of the driver's seat.

9. A riding type mower according to claim 1, wherein the link mechanism includes a first rotating shaft having the first axis, and a second rotating shaft having the second axis, the first rotating shaft supporting the lower limit adjustment element at an upper end thereof, the second rotating shaft supporting the stopper at a lower end thereof.

10. A riding type mower according to claim 9, further comprising a link gear provided at a lower end side of the first rotating shaft, and a rotating gear provided at an upper end side of the second rotating shaft, the link gear and the rotating gear being meshed with each other.

* * * * *